April 9, 1963  H. C. KENDALL ET AL  3,085,201
ELECTRONIC SPEED MEASURING APPARATUS
Original Filed Aug. 19, 1953   2 Sheets-Sheet 1
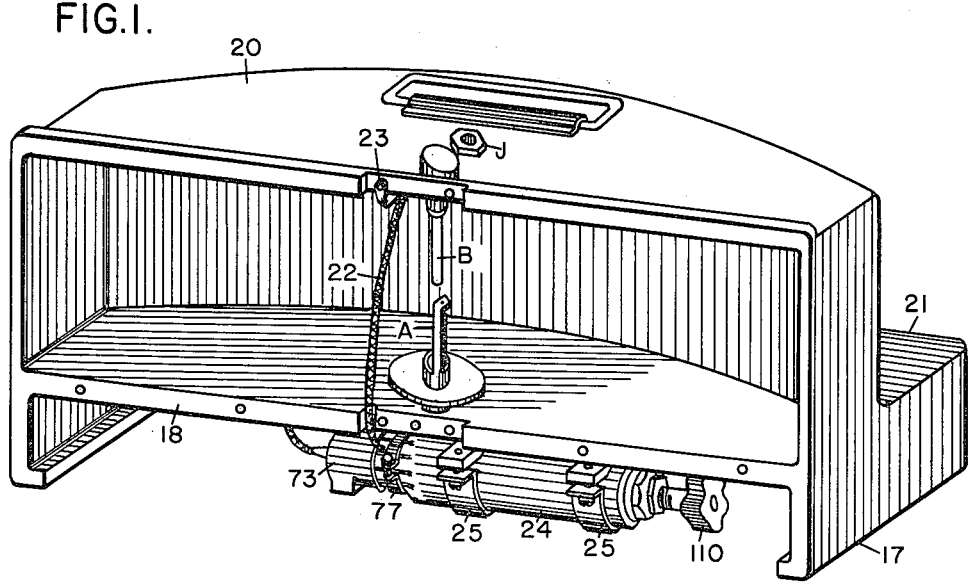
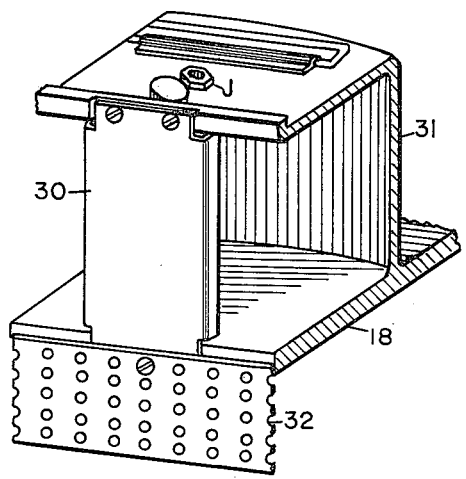
INVENTORS
H. C. KENDALL AND
BY  J. H. AUER JR.
THEIR ATTORNEY

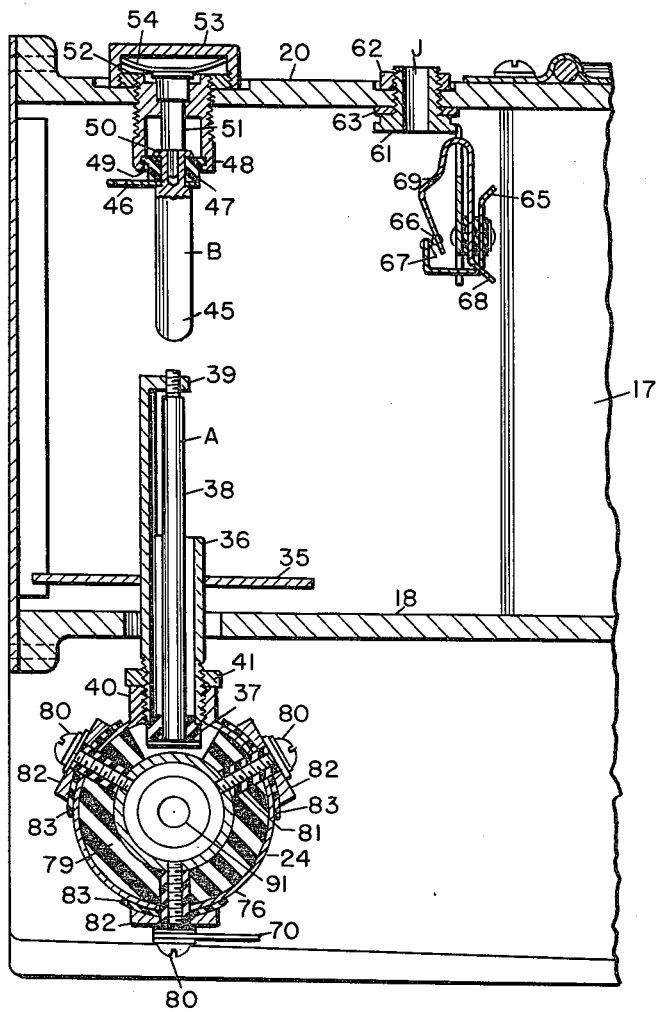

United States Patent Office 3,085,201
Patented Apr. 9, 1963

3,085,201
ELECTRONIC SPEED MEASURING APPARATUS
Hugh C. Kendall and John H. Auer, Jr., Rochester, N.Y., assignors to General Railway Signal Company, Rochester, N.Y.
Original application Aug. 19, 1953, Ser. No. 375,192, now Patent No. 2,805,335, dated Sept. 3, 1957. Divided and this application June 12, 1957, Ser. No. 665,184
1 Claim. (Cl. 325—16)

This invention relates to apparatus for measuring the speed of moving objects, and more particularly pertains to transmitting and receiving apparatus for measuring the speeds of moving vehicles according to the Doppler frequency shift of a high frequency radio signal. The present application is a division of our copending application Serial No. 375,192, filed August 19, 1953, now Patent No. 2,805,335, and no claims is intended to be made herein to subject matter disclosed and claimed in such prior application.

The apparatus of this invention is especially useful in measuring the speeds of railway cars as they pass through the car retarders of a railway hump classification yard. In such a yard, the cars are pushed over the crest of a hump and then allowed to roll either singly or in "cuts" of two or more cars down the hump and over a plurality of route selecting switches to a particular one of a number of classification tracks selected according to the car's destination.

As each car or cut of cars rolls down the slope of the hump, it passes through a plurality of car retarders, each of which is selectively controllable as to the braking force it exerts on the wheels of each car and also the length of time such force is applied. In this way, the speeds of the cars can be properly controlled so that they will enter their destination tracks at the proper speed and couple to the cars already in such track at a low speed, thereby avoiding damage to the cars and their contents. Systems of this kind wherein the car retarders are automatically controlled according to the weight, destination, and speed of the cars are disclosed in the copending applications of N. C. L. Brown, Serial No. 359,052, filed June 2, 1953 and of N. B. Coley, Serial No. 359,069, filed June 2, 1953.

In such systems for automatically controlling the retarder of a car classification yard as disclosed in these prior applications, information as to the speed of the cars as they pass through the car retarders is preferably provided by means of an organization known as an interferometer or continuous-wave radar, one of which is associated with each car retarder. This apparatus includes transmitting and receiving equipment which may be located between the track rails near the exit end of a retarder and is effective to cause a beam of high frequency radio energy to be constantly transmitted toward approaching vehicles. A portion of such transmitted energy is reflected from the approaching vehicle back to the receiving apparatus with a slightly higher frequency than the transmitted signal, and this frequency shift is proportional to the velocity of the approaching car in accordance with the Doppler principle.

By mixing a portion of the transmitted signal with the reflected signal of higher frequency that is received, a beat frequency signal may be extracted whose frequency equals the Doppler frequency. By providing apparatus which is distinctively responsive to the frequency value of this beat frequency signal, the speeds of approaching vehicles are continually and accurately determined. A circuit organization for accomplishing this function is disclosed and claimed in the prior co-pending application of H. C. Kendall and J. H. Auer, Jr., Serial No. 359,162, filed June 2, 1953.

An object of this invention is to provide a receiving antenna for an interferometer having an associated rectifying means mounted integrally therewith to reduce the effects of stray coupling and losses at the microwave frequency employed.

Other objects, purposes, and characteristic features of this invention will in part be obvious from the accompanying drawings and in part pointed out as the description of the invention progresses.

In the description of the invention, reference will be made to the accompanying drawings in which like reference characters designate corresponding parts in the several views and in which:

FIG. 1 illustrates the common reflecting horn and the associated transmitting antenna, receiving antenna, and reentrant cavity resonator;

FIG. 2 illustrates a portion of the apparatus of FIG. 1 but with a reflecting shield in place in front of the antennas so as to produce the desired radiation pattern; and FIG. 3 is an enlarged sectional view of the structure of FIG. 1 showing in detail both transmitting and receiving antennas and the reentrant type cavity resonator.

FIG. 1 comprises a view of the common reflecting horn 17 used for both receiving and transmitting antennas. This view also shows the transmitting antenna A and receiving antenna B, both of which are mounted within the space enclosed by the surfaces of the parabolic reflecting horn. On the bottom side of the shelf 18, whose upper surface comprises a portion of the reflecting horn, is mounted, by means of clamps 25, a reentrant type of cavity resonator 24 which provides the high frequency oscillations that are transmitted toward approaching vehicles. A portion of a metering jack J is shown mounted in the upper surface 20.

High frequency energy reflected from a target and intercepted by the receiving antenna B is rectified by a crystal rectifier 51 shown in FIG. 3 and the resulting beat frequency is then transferred over the shielded cable 22 to various other electrical components mounted on the lower surface 18. This shielded cable has its shield grounded by being connected to the terminal 23 which is connected directly to the horn 17. In practice, other electrical components and devices such as electron tubes, transformers, resistors, and the like, may be mounted on the shelf 21 and also on the bottom surface of shelf 18 although these components have not been illustrated in FIG. 1.

FIG. 2 illustrates a portion of the horn of FIG. 1, showing particularly the way in which a reflecting shield 30 is mounted over the front opening of the horn directly in front of the antennas A and B. This reflecting shield 30 prevents high frequency energy from being radiated directly from the transmitting antenna A toward the target. Energy radiated from this antenna A which strikes the reflecting shield 30 is reflected back to the horn and then again reflected from the back surface 31 of the horn, thereby causing energy to be transmitted in the desired pattern along the axis of the parabolic back surface 31. This FIG. 2 also shows the protecting cover 32 in place. This cover is shown removed in FIG. 1 so that the cavity resonator 24 can more clearly be seen.

FIG. 3 is a sectional view of the apparatus shown in FIG. 1. This sectional view is taken on a vertical plane through both the transmitting and receiving antennas A and B, respectively. In this FIG. 3, the transmitting antenna A is shown as comprising what is known as a folded quarter-wave ground plane antenna. The circular disc 35 forming the ground plane is soldered to the sleeve 36. Inside this sleeve 36 is an insulating bushing 37 having a hollow core in which is inserted a probe 38. This probe 38 is threaded at its upper end into the bent over portion 39 of the sleeve 36. The sleeve 36 extends through a clearance hole in the shelf 18 and is threaded into a boss 40 on the cavity resonator 24. The lower end of the probe 38 thus extends directly into the cavity 24 so that high frequency energy is coupled directly to the transmitting antenna A. The amount of coupling of the probe 38 to the cavity 24 is adjustable by rotating the threaded sleeve 36 in the boss 40 so as to vary the amount by which the lower end of the probe extends into the cavity 24. The desired coupling adjustment is maintained by a lock nut 41. The use of a ground plane as provided by the disc 35 permits varying the coupling of the probe to the cavity without varying the distance by which the folded quarter-wave antenna extends above its associated ground plane.

The receiving antenna B is also a quarter-wave antenna with the upper surface of the horn acting as its counterpoise. This antenna comprises a cylindrical radiator 45 having a soldering lug 46 fastened thereto, with the upper end of the radiator inserted into a hole in the insulating bushing 47. The soldering lug abuts against a shoulder on the radiator 45. Both insulating bushing 47 and lug 46 are held in place on the end portion of radiator 45 by spinning over the rim 50 of the radiator 45. The bushing 47 is held in place in the sleeve 48 by causing the rim 49 of the sleeve 48 to be spun over the bushing 47.

The sleeve 48 has its outer surface threaded so as to fit into a threaded hole in the upper surface of the reflecting horn 20. The sleeve 48 is provided with an opening into which fits a crystal rectifier 51, one end of which is seated in a hole drilled into the upper end of the radiator 45. The radiator 45 is, of course, insulated from the sleeve 48 by the insulating bushing 47.

A nut 52, threaded both on the inside and outside, fastens over the upper threaded portion of the sleeve 48 to thereby lock the sleeve in the desired position with respect to the upper surface of the horn 20. A cap 53, threaded on the inside, screws onto the nut 52 and causes a spring 54 to exert pressure on the crystal 51 so that it will be maintained in proper contact with the radiator 45, and also insure that its upper end is connected to the upper surface of the horn 20 which is at ground potential. The signal received by this receiving antenna B and rectified by the crystal rectifier is coupled to an associated preamplifier by means of a connection made to the terminal 46.

A metering jack J is also mounted through the upper surface of the horn 20. This jack is associated electrically with the receiving antenna in such a manner as to permit measuring the current through a resistor (not shown) that is connected in parallel with the crystal rectifier 51. This jack J comprises a bushing 61 which is inserted through a hole in the upper surface of the horn 20, and secured by means of a nut 62 which is screwed onto the outer threaded portion of the member 61 extending above the upper surface of the horn 20. A metal washer 63 may be used, if desired, between the bushing 61 and the bottom surface to prevent rotation of the jack J as the nut 62 is tightened.

A connection made to the terminal 68 is ordinarily completed through the closed contacts 66 and 67 to the terminal 65, which is grounded to horn 17. Such a circuit connection is ordinarily made in series with the above-mentioned resistor so that the current passing through the resistor also passes through the above-described circuit provided by the jack J.

When a plug is inserted through the opening in the bushing 61, the tip of such plug pushes against the spring-like member 69 so as to open the series circuit at contact 66 and 67, and the sleeve of such plug then makes contact with member 61. A current meter having its terminals connected respectively to the sleeve and tip of such plug will then have flowing through its winding the current desired to be measured. This current will flow through the meter rather than through the previously described circuit provided by the jack which is now open-circuited.

It has been found that the jack J should preferably be located directly behind the receiving antenna B and with a distance between jack and antenna approximating a quarter-wave length of the frequency used in the interferometer system. When these conditions are fulfilled, it is found that the jack J provides the effect of acting as a parasitic element with respect to the receiving antenna. As a result, the apparent gain of the receiving antenna B is increased so that a high output is obtained from the antenna for a given amplitude of reflected signal.

Having described an interferometer structure and related apparatus as one specific embodiment of this invention, we desire it to be understood that this form is selected merely to illustrate the principles of this invention and that other embodiments, adaptations, and modifications may be employed without departing from the spirit or scope of this invention.

What we claim is:

In a system for measuring the speeds of railway vehicles wherein a beam of high frequency energy is continuously directed toward said vehicles, a reflecting horn having parallel plane top and bottom surfaces and a reflecting back surface following a parabolic curve, transmitting and receiving antennas protruding perpendicularly from said top and bottom surfaces at the focus of said parabola, said receiving antenna comprising, a bushing extending through and fastened to said upper surface and adapted to receive into its lower hollow core portion an end of a cylindrical radiator, insulating means for electrically insulating said radiator from said bushing, a crystal rectifier also fitting into said hollow core of said bushing and contacting at its one end thereof the end of said radiator inserted into said bushing, means including a resilient member for pressing against the other end of said rectifier to maintain said rectifier in a tight electrical contact with said radiator and for connecting said other end of said rectifier electrically to said upper plane surface of said horn.

References Cited in the file of this patent

UNITED STATES PATENTS

| | | |
|---|---|---|
| 2,433,387 | Mumford | Dec. 30, 1947 |
| 2,556,087 | Iams | June 5, 1951 |
| 2,671,855 | Atta | Mar. 9, 1954 |

FOREIGN PATENTS

| | | |
|---|---|---|
| 588,526 | Great Britain | May 27, 1947 |